UNITED STATES PATENT OFFICE.

JUL. E. SCHWABE, OF NEW YORK, N. Y.

IMPROVEMENT IN TREATING GALENA OR LEAD ORE.

Specification forming part of Letters Patent No. 13,961, dated December 18, 1855.

*To all whom it may concern:*

Be it known that I, JULIUS E. SCHWABE, of the city and State of New York, have invented a new and Improved Mode of Converting the Native Sulphuret of Lead Directly into Salts of Lead, useful and applicable in the manufacture of lead pigments; and I declare that the following is a full and exact description thereof.

The nature of my invention consists in decomposing powdered galena ore by means of rock-salt and sulphuric acid in chloride and sulphate of the oxide of lead, both of which are known to be useful for the production of lead pigments, and give, if treated with carbonates, carbonate of lead, or, if with chromates, the different shades of chrome yellow.

To enable others skilled in the art to make and use my invention, I will proceed to give a full and exact description thereof.

Of finely-powdered and well-washed galena ore I mix one hundred pounds with fifty pounds or more of common rock-salt in a large cast-iron vessel lined with lead, or in another suitable vessel that can withstand the action of the acids and may be conveniently heated and provided with proper apparatus for leading off the escaping gases. To the above mixture I add sufficient sulphuric acid for complete decomposition of the rock-salt—that is, from thirty-seven to forty pounds or more of an acid of 65° Baumé, or its equivalent of an acid of different strength. As soon as the acid comes in contact with the mass the decomposition begins, as the chlorhydric acid formed by the action of the sulphuric acid on the rock-salt drives off the sulphur of the ore as sulphureted hydrogen and unites with the lead to form chloride of lead. By a low and well-regulated heat the action is much accelerated. The mass begins to swell and becomes whiter and whiter. Small quantities of water may be added from time to time, and under continual stirring and moderate heat the operation is continued till the whole mass is converted into a whitish muddy substance, or till no more evolution of sulphureted hydrogen is perceptible. Then I add more and more water gradually till about one gallon of water is added for every ten pounds of ore taken in operation. I boil it for about fifteen minutes, then let the insoluble mass settle. The liquor is drawn off and the mass transferred to lixiviating-vats, in which the soluble soda salt is completely washed out. The remaining insoluble whitish substance consists of more or less chloride and sulphate of lead, and contains generally some undecomposed ore, which may be easily separated by washing in consequence of its specific gravity being higher than that of the white lead salts. The white salts of lead are now ready for further treatment, which of course has to vary according to the colors which are intended to be made. For instance, in order to prepare white lead—that is, carbonate of lead—it is to be treated with its equivalent of a carbonate, or to produce chrome colors it must be acted upon by chromates in the proper proportion and manner; but as the preparation of such pigments from the chloride and sulphate of lead is generally known and described in various works of chemistry, I need not describe the details of the operations.

I do not exactly confine myself to the proportions of rock-salt or sulphuric acid mentioned above, but vary them according to circumstances—that is, according to the purity of the ore and materials used—as a lead ore containing ores of copper, iron, or zinc will require in proportion more of rock-salt and sulphuric acid for complete decomposition than the purest lead ore, which should invariably be selected for the above-described treatment. Likewise I may substitute other chlorides for the rock-salt, as chloride of potash.

What I claim as my invention, and desire to secure by Letters Patent, is—

The method of treating galena by means of common salt or its chemical equivalent and sulphuric acid, in the manner and for the purposes as described.

JULIUS E. SCHWABE.

Witnesses:
J. HARTMAN,
C. WERNER.